US012665444B2

(12) United States Patent (10) Patent No.: US 12,665,444 B2
Suzuki (45) Date of Patent: Jun. 23, 2026

(54) CHARGING DEVICE, POWER RECEIVING DEVICE, AND METHOD

(71) Applicant: Sony Group Corporation, Tokyo (JP)

(72) Inventor: Katsuya Suzuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 816 days.

(21) Appl. No.: 18/001,270

(22) PCT Filed: Jun. 16, 2020

(86) PCT No.: PCT/JP2020/023619
§ 371 (c)(1),
(2) Date: Dec. 9, 2022

(87) PCT Pub. No.: WO2021/255832
PCT Pub. Date: Dec. 23, 2021

(65) Prior Publication Data
US 2023/0307960 A1 Sep. 28, 2023

(51) Int. Cl.
*H02J 50/60* (2016.01)
*H02J 50/10* (2016.01)
*H02J 50/80* (2016.01)
(52) U.S. Cl.
CPC .............. *H02J 50/60* (2016.02); *H02J 50/10* (2016.02); *H02J 50/80* (2016.02)
(58) Field of Classification Search
CPC .. H02J 50/60; H02J 50/10; H02J 50/80; H02J 50/12
See application file for complete search history.

(56) References Cited

U.S. PATENT DOCUMENTS 9,531,206 B2 * 12/2016 Tsai ........................ H02J 50/60
9,720,467 B2 * 8/2017 Jain ........................ G06F 1/206
(Continued)

FOREIGN PATENT DOCUMENTS

JP 2014-093921 A 5/2014
JP 2016-528831 A 9/2016
(Continued)

OTHER PUBLICATIONS

WPC (Wireless Power Consortium), The Qi specifications "Introduction to the Power Class 0 Specification" version 1.2.4, [retrieved on May 15, 2020], Internet, <URL:https://www.wirelesspowerconsortium.com/knowledge-base/specifications/download-the-qi-specifications.html>. (Copy not available; submitting version 1.2.3, dated Feb. 2017, 16 pages.).
(Continued)

*Primary Examiner* — Jared Fureman
(74) *Attorney, Agent, or Firm* — XSENSUS LLP

(57) ABSTRACT

Attenuation of transmission power transmitted from a power transmission coil according to distance causes a problem that a power receiving device such as a smartphone with an accessory cover may increase a difference from reception power received by a power reception coil and prevent normal charging. Therefore, provided is a charging device including, for example, a transmission unit that periodically transmits a response request, a reception unit that receives a response to the response request from a power receiving device, a determination unit that determines whether a power intensity of the response request received by the power receiving device, indicated by the response, is equal to or less than a predetermined threshold, and a power control unit that increases output power of the response request when it is determined that the power intensity is equal to or less than the predetermined threshold.

16 Claims, 15 Drawing Sheets

(56) References Cited

U.S. PATENT DOCUMENTS

| | | | |
|---|---|---|---|
| 10,320,236 B2 * | 6/2019 | Park | H02M 3/33571 |
| 10,547,207 B2 * | 1/2020 | Wang | H02J 50/10 |
| 12,136,835 B2 * | 11/2024 | Noh | H02J 50/402 |
| 2014/0001881 A1 | 1/2014 | Murakami | |
| 2016/0211703 A1 | 7/2016 | Eguchi | |
| 2016/0336807 A1 * | 11/2016 | Mach | H02J 50/80 |
| 2017/0017442 A1 | 1/2017 | Ishii | |
| 2019/0131826 A1 | 5/2019 | Park | |
| 2019/0173309 A1 * | 6/2019 | Jung | H02J 50/90 |
| 2020/0259373 A1 | 8/2020 | Park | |
| 2021/0226482 A1 | 7/2021 | Park | |
| 2022/0052557 A1 * | 2/2022 | Goodchild | H02J 50/402 |
| 2023/0307960 A1 * | 9/2023 | Suzuki | H02J 50/60 |

FOREIGN PATENT DOCUMENTS

| | | | |
|---|---|---|---|
| JP | 2017-050939 A | 3/2017 | |
| JP | 2018-050462 A | 3/2018 | |
| JP | 2020-036434 A | 3/2020 | |
| WO | 2006/109701 A1 | 10/2006 | |

OTHER PUBLICATIONS

International Search Report and Written Opinion mailed on Sep. 1, 2020, received for PCT Application PCT/JP2020/023619, filed on Jun. 16, 2020, 19 pages including English Translation.

* cited by examiner

Figure 17:
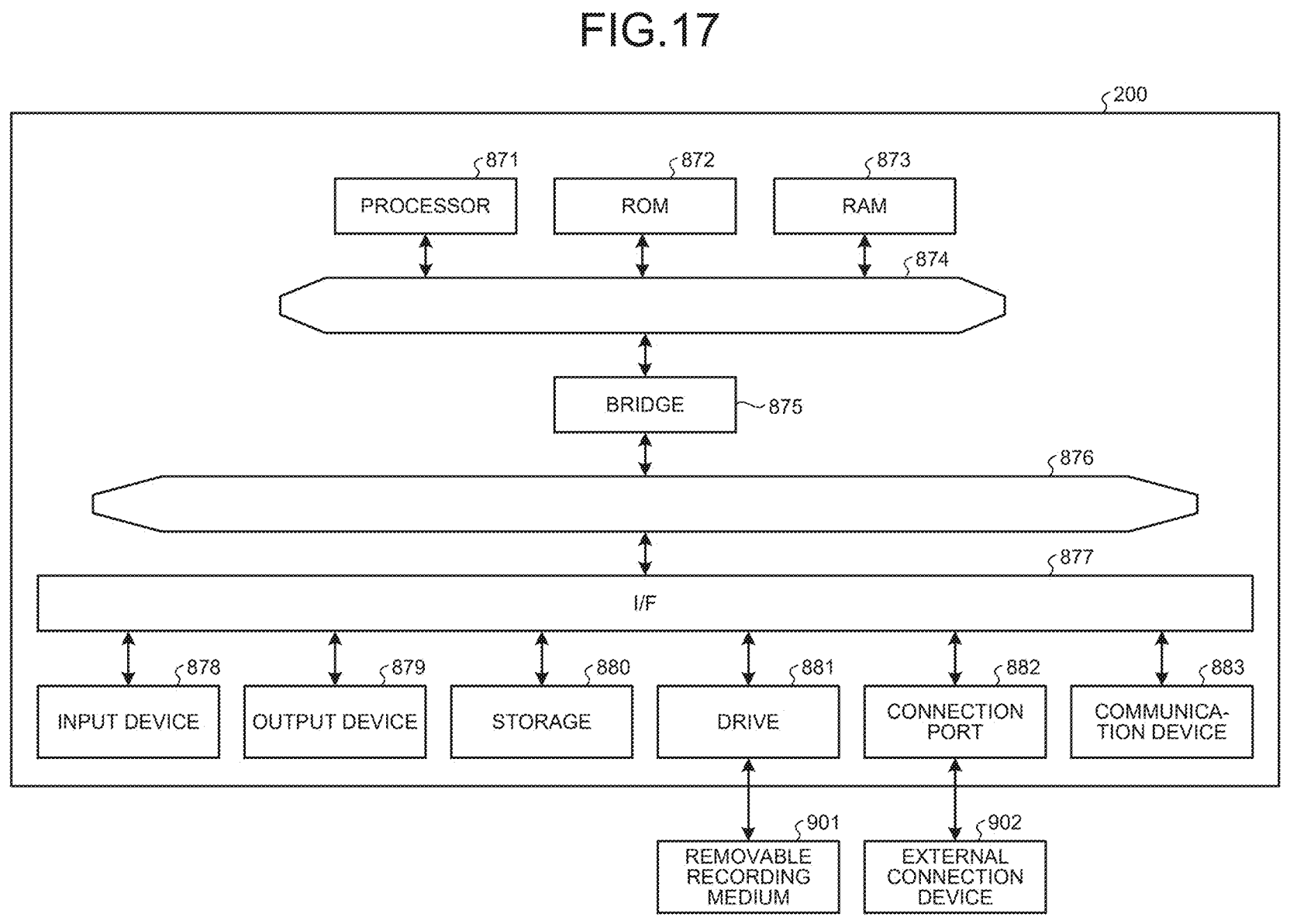

871 PROCESSOR

872 ROM

873 RAM

874

875 BRIDGE

876

877

I/F

878 INPUT DEVICE

879 OUTPUT DEVICE

880 STORAGE

881 DRIVE

882 CONNECTION PORT

883 COMMUNICATION DEVICE

901 REMOVABLE RECORDING MEDIUM

902 EXTERNAL CONNECTION DEVICE

CHARGING DEVICE, POWER RECEIVING DEVICE, AND METHOD

CROSS-REFERENCE TO RELATED APPLICATION

The present application is based on PCT filing PCT/JP2020/023619, filed Jun. 16, 2020, the entire contents of which are incorporated herein by reference.

FIELD

The present disclosure relates to a charging device, a power receiving device, and a method.

BACKGROUND

Contactless charging (also referred to as wireless power feeding, wireless power transfer, etc.) using electromagnetic induction has been provided to charge a power receiving device such as a smartphone being placed on a charging device (charging cradle). In the contactless charging using electromagnetic induction, power supplied by a power transmission coil mounted in the charging device is received by a power reception coil mounted in the power receiving device, whereby the power receiving device can be charged without being connected to a charging cable or the like.

While such contactless charging is convenient, there is also a problem that when a metal foreign object is interposed between the power transmission coil and the power reception coil, a current flowing through the metal foreign object leads to incorrect charging. In addition, excess current flowing through the metal foreign object may cause abnormal heat generation, leading to a dangerous accident such as a burn on a human body, damage of a device, or a fire.

Therefore, in Qi, which is an international standard for contactless charging, version 1.1 or later, charging devices for contactless charging are obliged to implement foreign object detection (FOD) function. The FOD function makes it possible for the charging devices to detect the metal foreign object and not to start or stop charging when the metal foreign object is detected, preventing a dangerous accident in advance.

In the FOD function, when a difference between transmission power transmitted from the power transmission coil and reception power received by the power reception coil is large, it is determined that current has flown in the metal foreign object, performing detection of the metal foreign object.

CITATION LIST

Non Patent Literature

Non Patent Literature 1: WPC (Wireless Power Consortium), The Qi specifications "Introduction to the Power Class 0 Specification" version 1.2.4, [pdf], [retrieved on May 15, 2020], Internet, <URL: https://www.wirelesspowerconsortium.com/knowledge-base/specifications/download-the-qi-specifications.html>

SUMMARY

Technical Problem

However, since the transmission power transmitted from the power transmission coil attenuates according to distance, there is a problem that the power receiving device such as a smartphone with an accessory cover may increase the difference from the reception power received by the power reception coil and prevent normal charging.

Therefore, the present disclosure proposes a charging device, a power receiving device, and a method that are configured to normally perform contactless charging even for a power receiving device with an accessory cover.

Solution to Problem

According to the present disclosure, a charging device including: a transmission unit that periodically transmits a response request; a reception unit that receives a response to the response request, from a power receiving device; a determination unit that determines whether a power intensity of the response request received by the power receiving device, indicated by the response, is equal to or less than a predetermined threshold; and a power control unit that increases output power when it is determined that the power intensity is equal to or less than the predetermined threshold.

Moreover, according to the present disclosure, a charging device including: a measurement unit that periodically measures a Q factor of a coil; a detection unit that detects a change in the Q factor from a predetermined reference value; a transmission unit that transmits a response request when the change in the Q factor from the predetermined reference value is detected; a reception unit that receives a response to the response request, from a power receiving device; and a power control unit that increases output power when the change in the Q factor from the predetermined reference value is detected and the response is not received.

Moreover, according to the present disclosure, a charging device including: a transmission unit that periodically transmits a response request; a reception unit that receives a response to the response request from a power receiving device; and a power control unit that periodically increases output power until receiving the response, when the response is not received, that periodically reduces the output power until receiving the response, when having increased the output power to a first threshold, that periodically increases the output power until receiving the response, when having reduced the output power to a second threshold.

Moreover, according to the present disclosure, a power receiving device including: a detection unit that detects application of an accessory cover; an adjustment unit that when the application of the accessory cover is detected, adjusts an FOD parameter so as not to erroneously detect a state where the accessory cover is applied, as presence of a foreign object; a calculation unit that calculates reception power presented to a charging device, based on the parameter; and a transmission unit that transmits the reception power to the charging device.

Moreover, according to the present disclosure, a power receiving device including: a display unit that displays a user interface (UI) for input of application/non-application of an accessory cover; an input reception unit that receives an input of the application/non-application of the accessory cover input via the UI; a detection unit that detects the application of the accessory cover, when the input indicates the application of the accessory cover; an adjustment unit that when the application of the accessory cover is detected, adjusts an FOD parameter so as not to erroneously detect a state where the accessory cover is applied, as presence of a foreign object; a calculation unit that calculates reception power presented to a charging device, based on the parameter; and a transmission unit that transmits the reception power to the charging device.

Moreover, according to the present disclosure, a charging device further including: a reception unit that receives a notification indicating that an accessory cover is applied to a power receiving device, from the power receiving device; and an adjustment unit that when the notification is received, adjusts an FOD threshold so as not to erroneously detect a state where the accessory cover is applied, as presence of a foreign object.

Moreover, according to the present disclosure, a method including: a charging device periodically transmitting a response request; receiving a response to the response request, from a power receiving device; determining whether a power intensity of the response request received by the power receiving device, indicated by the response, is equal to or less than a predetermined threshold; and increasing output power when it is determined that the power intensity is equal to or less than the predetermined threshold.

Moreover, according to the present disclosure, a method including: a charging device periodically transmitting a response request; receiving a response to the response request, from a power receiving device; measuring a Q factor of a coil; detecting a change in the Q factor from a predetermined reference value; and increasing output power when the change in the Q factor from the predetermined reference value is detected and the response request is not received.

Moreover, according to the present disclosure, a method including: a charging device periodically transmitting a response request; receiving a response to the response request from a power receiving device; periodically increasing output power until receiving the response, when the response is not received; periodically reducing the output power until receiving the response, when having increased the output power to a first threshold; and periodically increasing the output power until receiving the response, when having reduced the output power to a second threshold.

Moreover, according to the present disclosure, a method including: a power receiving device detecting application of an accessory cover; when the application of the accessory cover is detected, adjusting an FOD parameter so as not to erroneously detect a state where the accessory cover is applied, as presence of a foreign object; calculating reception power presented to a charging device, based on the parameter; and transmitting the reception power to the charging device.

Moreover, according to the present disclosure, a method including: a power receiving device displaying a user interface (UI) for input of application/non-application of an accessory cover; receiving an input of the application/non-application of the accessory cover input via the UI; when the input indicates the application of the accessory cover, adjusting an FOD parameter so as not to erroneously detect a state where the accessory cover is applied, as presence of a foreign object; calculating reception power presented to a charging device, based on the parameter; and transmitting the reception power to the charging device.

Moreover, according to the present disclosure, a method including: a charging device receiving a notification indicating that an accessory cover is applied to a power receiving device, from the power receiving device; and when the notification is received, adjusting an FOD threshold so as not to erroneously detect a state where the accessory cover is applied, as presence of a foreign object.

BRIEF DESCRIPTION OF DRAWINGS

FIG. 17 is a block diagram illustrating an exemplary hardware configuration of the power receiving device 200 according to the embodiment.

DESCRIPTION OF EMBODIMENTS

Figure 1:
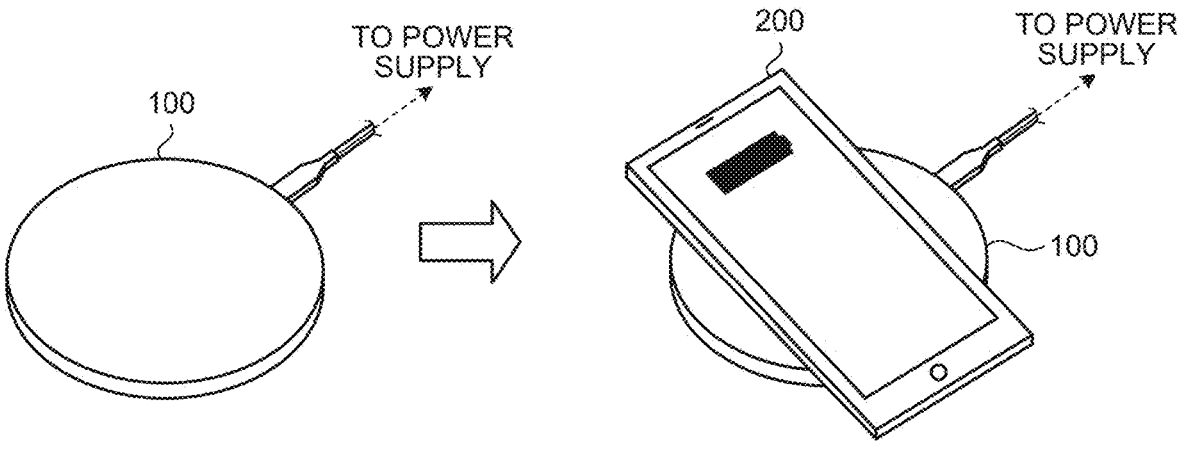
FIG. 1 is a diagram illustrating an example of a charging device 100 and a power receiving device 200 according to the present embodiment.

The embodiments of the present disclosure will be described in detail below with reference to the drawings. Note that in the present description and the drawings, substantially the same portions are denoted by the same reference numerals, and redundant description thereof will be omitted.

Note that the description will be given in the following order.

1. Functional overview
2. Details of functions
2.1. First Embodiment
2.2. Second Embodiment
2.3. Third Embodiment
2.4. Fourth Embodiment
2.5. Fifth Embodiment
2.6. Sixth Embodiment
3. Exemplary hardware configuration
4. Conclusion

1. Functional Overview

First, a charging device 100 and a power receiving device 200 according to the present embodiment will be described. FIG. 1 is a diagram illustrating an example of the charging device 100 and the power receiving device 200 according to the embodiment.

The charging device 100 is a so-called wireless charger that is configured to perform power transfer to the power receiving device 200 without a metal contact, a connector, or the like and to charge the power receiving device 200. The charging device 100 has, for example, a plate shape as illustrated on the left side of FIG. 1, and is used by being placed on a floor or the like. In addition, the charging device 100 is connected to a power supply (not illustrated) via a power cable and receives power supplied. Note that the shape, size, color, and the like of the charging device 100 are not limited to those illustrated in FIG. 1, and may be, for example, a cradle type that is stood on a floor or the like for use.

The power receiving device 200 is, for example, a mobile terminal such as a smartphone, a tablet personal computer (PC), or a game machine. As illustrated on the right side of FIG. 1, the power receiving device 200 is configured to be placed on the charging device 100 to receive power supplied by contactless charging without being directly connected to the power supply or the like.

Figure 2:
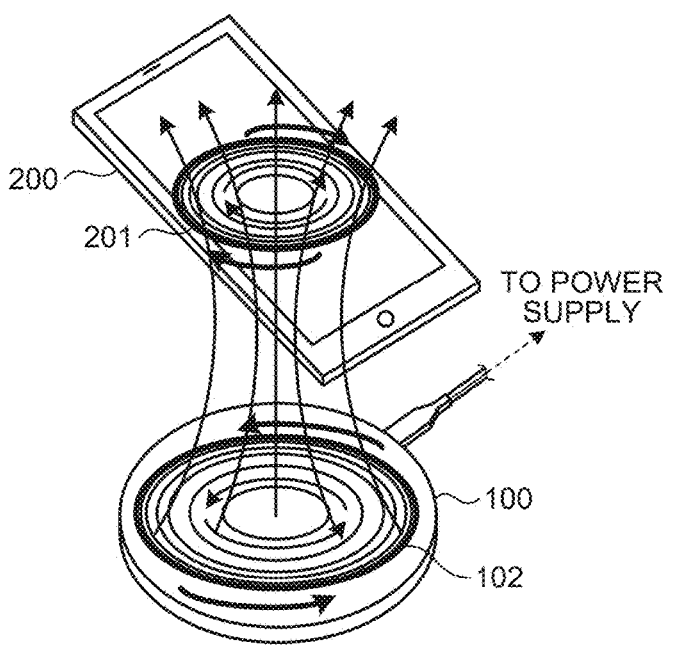
FIG. 2 is a diagram illustrating an example of contactless charging by a power transmission coil 102 and a power reception coil 201 according to the embodiment.

Next, the contactless charging according to the present embodiment will be described. FIG. 2 is a diagram illustrating an example of the contactless charging by a power transmission coil 102 and a power reception coil 201 according to the present embodiment. The power transmission coil 102 included in the charging device 100 generates a magnetic field (magnetic flux) when electricity flows therethrough from the power supply. As illustrated in FIG. 2, approaching of the power reception coil 201 included in the power receiving device 200 to the magnetic field generates an induced current, and it is possible to charge the power receiving device 200 with power.

Note that the power transmission coil 102 and the power reception coil 201 illustrated in FIG. 2 are for illustrative purposes, are actually positioned inside the charging device 100 and the power receiving device 200, respectively, and thus cannot be viewed from outside.

Figure 3:
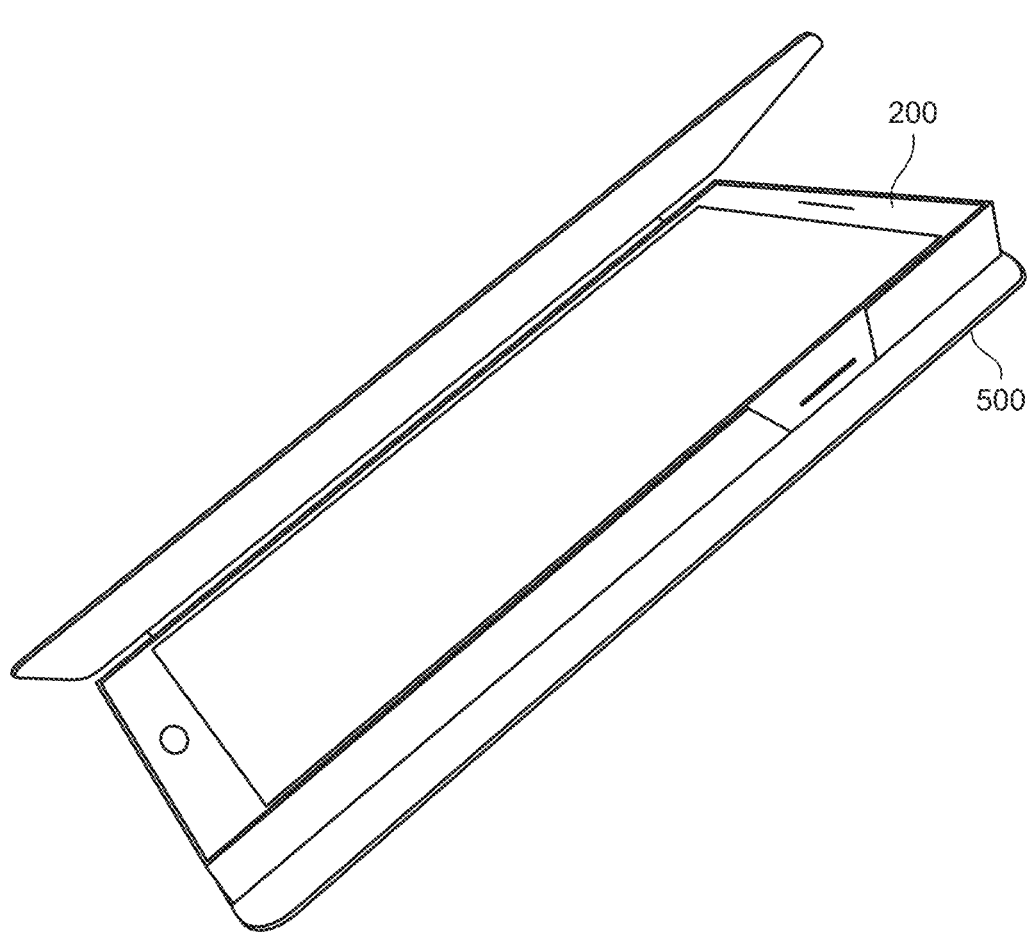
FIG. 3 is a diagram illustrating an example of the power receiving device 200 with an accessory cover 500 according to the embodiment.

As illustrated in FIG. 2, the power receiving device 200 can receive power supplied from the charging device 100 by contactless charging, but in some cases, the contactless charging is not normally performed for the power receiving device 200 with an accessory cover. FIG. 3 is a diagram illustrating an example of the power receiving device 200 with the accessory cover 500 according to the embodiment. As illustrated in FIG. 3, for example, in a case where the accessory cover 500 covers the back surface of the power receiving device 200, the contactless charging is not normally performed even if the power receiving device 200 is placed on the charging device 100 as illustrated on the right side of FIG. 1, in some cases. In the present embodiment, in order to solve such a problem, contactless charging systems according to first to sixth embodiments will be described.

Figure 4:
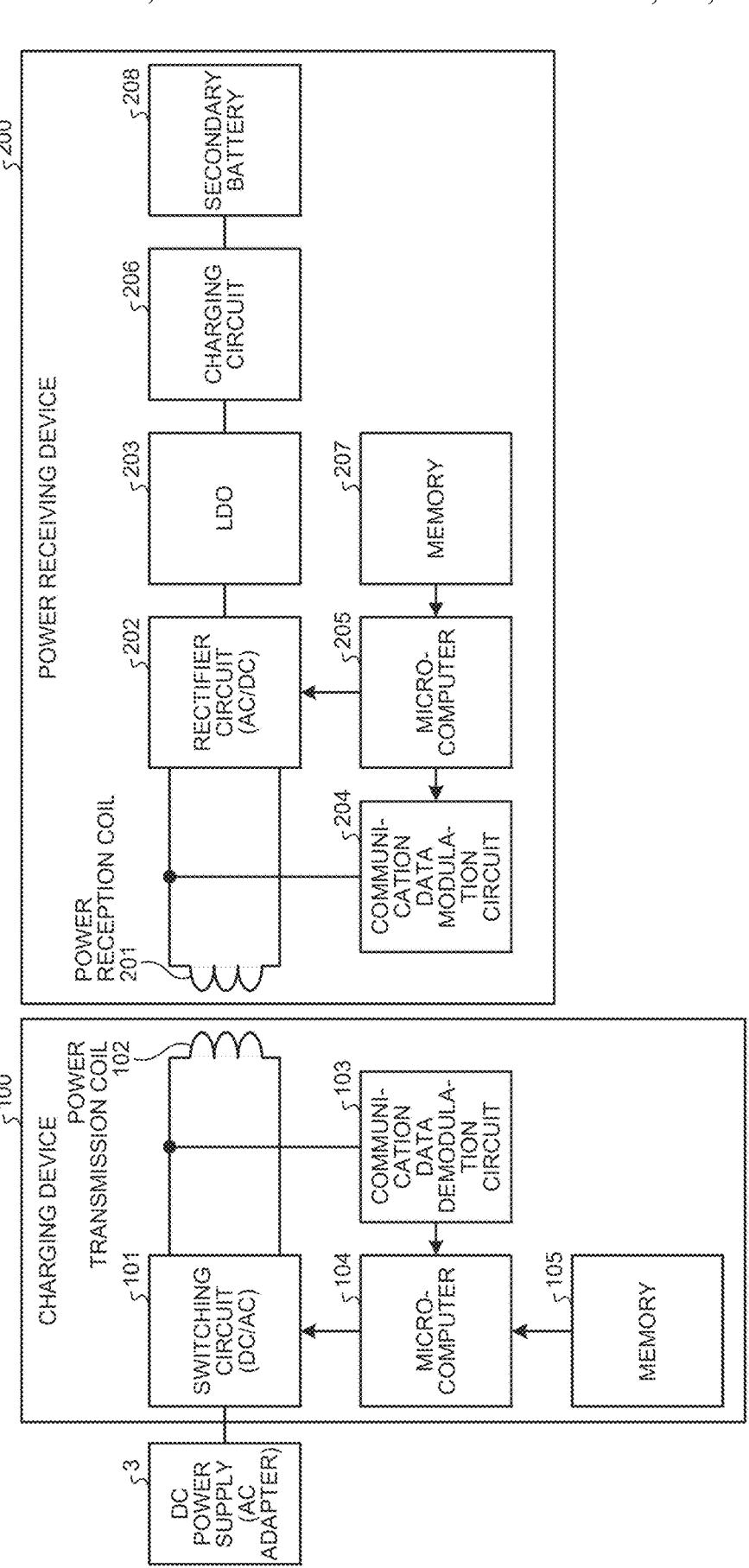
FIG. 4 is a diagram illustrating a configuration example of a contactless charging system according to the embodiment.

FIG. 4 is a diagram illustrating a configuration example of the contactless charging system according to the present embodiment. The contactless charging system includes a DC power supply 3, the charging device 100, and the power receiving device 200.

The charging device 100 is connected to the DC power supply 3 by the power cable, and receives power supplied from the DC power supply 3. In addition, the charging device 100 includes a switching circuit 101 that converts DC power into AC power, the power transmission coil 102 that supplies the AC power to the power receiving device 200, a communication data demodulation circuit 103 that demodulates reception data from the power receiving device 200, a microcomputer 104 that controls processes in the contactless charging system, and a memory 105 that stores various programs of the microcomputer 104, various parameters required for the contactless charging system, and the like. The processes controlled by the microcomputer 104 are different in the embodiments, and details thereof will be described later in the respective embodiments.

The power receiving device 200 receives power supplied from the charging device 100 by contactless charging via the power reception coil 201. In addition, the power receiving device 200 includes the power reception coil 201 that receives power supplied from the charging device 100, a rectifier circuit 202 that converts the AC power into DC power, a low dropout (LDO) 203 that adjusts output power from the rectifier circuit 202 and transmits the adjusted output power to a charging circuit 206, a communication data modulation circuit 204 that modulates transmission data to the charging device 100, a microcomputer 205 that controls each process in the contactless charging system, the charging circuit 206 that controls charging of a secondary battery 208, a memory 207 that stores various programs of the microcomputer 205, various parameters required for the contactless charging system, and the like, and the secondary battery 208 that is a so-called battery. The microcomputer 205 will be described in detail later in each embodiment.

2. Details of Functions

Figure 5:
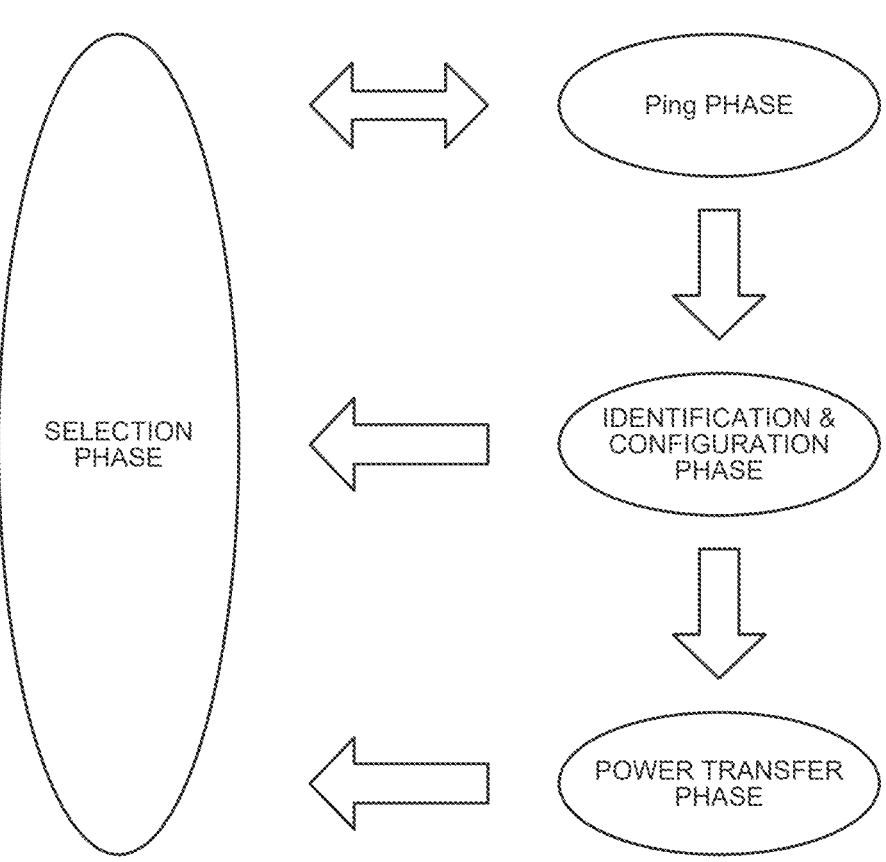
FIG. 5 is a diagram illustrating an example of a control phase of the contactless charging system according to the embodiment.

Next, the contactless charging system will be described in each embodiment, but first, a control phase of the contactless charging system will be described. FIG. 5 is a diagram illustrating an example of the control phase of the contactless charging system according to the present embodiment.

Selection phase is an initial state. When an abnormality is detected during charging of the power receiving device 200 in another phase or when charging of the power receiving device 200 is completed, the contactless charging system returns to the Selection phase.

Ping phase is a state where the charging device 100 performs intermittent power transmission to detect the power receiving device 200. By the intermittent power transmission in the Ping phase, the charging device 100 receives a signal strength packet (SSP) transmitted from the power receiving device 200. The SSP indicates the intensity of power (reception power) from the charging device 100, received by the power receiving device 200. When the SSP is received, the contactless charging system enters Identification & Configuration phase. Note that when the detected object is not the power receiving device 200, the SSP is not received, and thus the contactless charging system returns to the Selection phase.

In the Identification & Configuration phase, individual information and configuration information are transmitted from the power receiving device 200, and the charging device 100 that has received the information starts preparation for power transfer. When the preparation for power transfer is completed, contactless charging system enters Power Transfer phase, and supply of power to the power receiving device 200 is started.

2.1. First Embodiment

Next, the first embodiment of the present embodiment will be described. In a conventional contactless charging system, when the charging device 100 receives the SSP from the power receiving device 200, the charging device 100 determines that power can be normally transmitted to the power receiving device 200, and holds output power at that time. Then, the charging device 100 supplies power to the power receiving device 200 by using the output power held. Therefore, when the reception power of the power receiving device 200 decreases due to the accessory cover 500 or the like applied to the power receiving device 200, charging of the power receiving device 200 may not be normally performed, in some cases.

Therefore, in the first embodiment, the charging device 100 adjusts the output power of the charging device 100 (i.e., transmission power from the charging device 100 to the power receiving device 200), on the basis of the SSP indicating the reception power of the power receiving device 200 so that the charging of the power receiving device 200 is normally performed.

Figure 6:
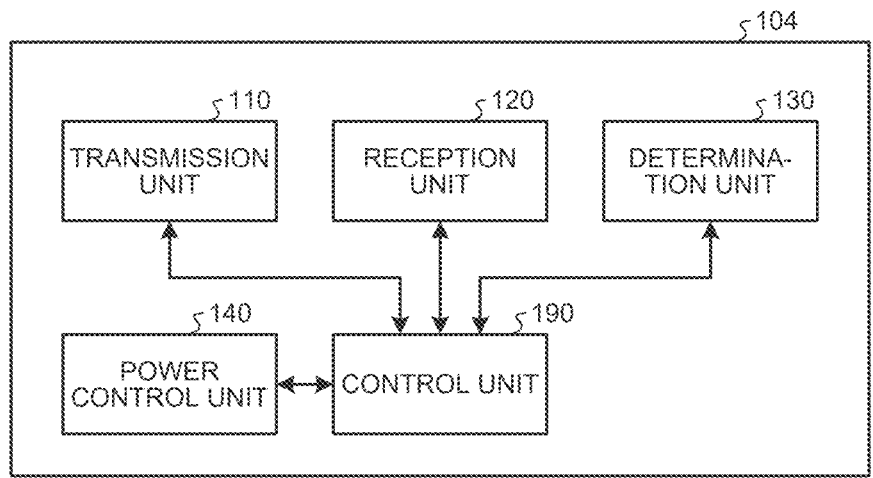
FIG. 6 is a block diagram illustrating an exemplary functional configuration of a microcomputer 104 according to first and third embodiments of the present embodiment.

FIG. 6 is a block diagram illustrating an exemplary functional configuration of the microcomputer 104 according to the first and third embodiments of the present embodiment. As illustrated in FIG. 6, the microcomputer 104 according to the first embodiment includes a transmission unit 110, a reception unit 120, a determination unit 130, a power control unit 140, and a control unit 190 that controls each configuration included in the microcomputer 104.

(Transmission unit 110)

The transmission unit 110 according to the first embodiment periodically transmits a response request. The transmission of the response request is intermittent power transmission for detecting the power receiving device 200. In addition, when no response to the response request is received from the power receiving device 200 within a certain time after the transmission of the response request, the transmission unit 110 transmits the response request again.

(Reception Unit 120)

The reception unit 120 according to the first embodiment receives a response (i.e., SSP) to the response request transmitted by the transmission unit 110, from the power receiving device 200. Receiving the response from the power receiving device 200 in this manner, the charging device 100 determines that power is supplied to a regular counterpart. In other words, when no response is received from the power receiving device 200, the charging device 100 performs control so as not to start supply of power or to stop supply of power in a case where the supply of power has already been started.

(Determination unit 130)

The determination unit 130 according to the first embodiment determines whether power intensity of the response request received by the power receiving device 200, indicated by the response received by the reception unit 120, is equal to or less than a predetermined threshold.

(Power Control Unit 140)

The power control unit 140 according to the first embodiment increases the output power, when the determination unit 130 determines that the power intensity of the response request received by the power receiving device 200 is equal to or less than the predetermined threshold. This configuration makes it possible to increase the output power up to power at which charging of the power receiving device 200 is normally performed.

Figure 7:
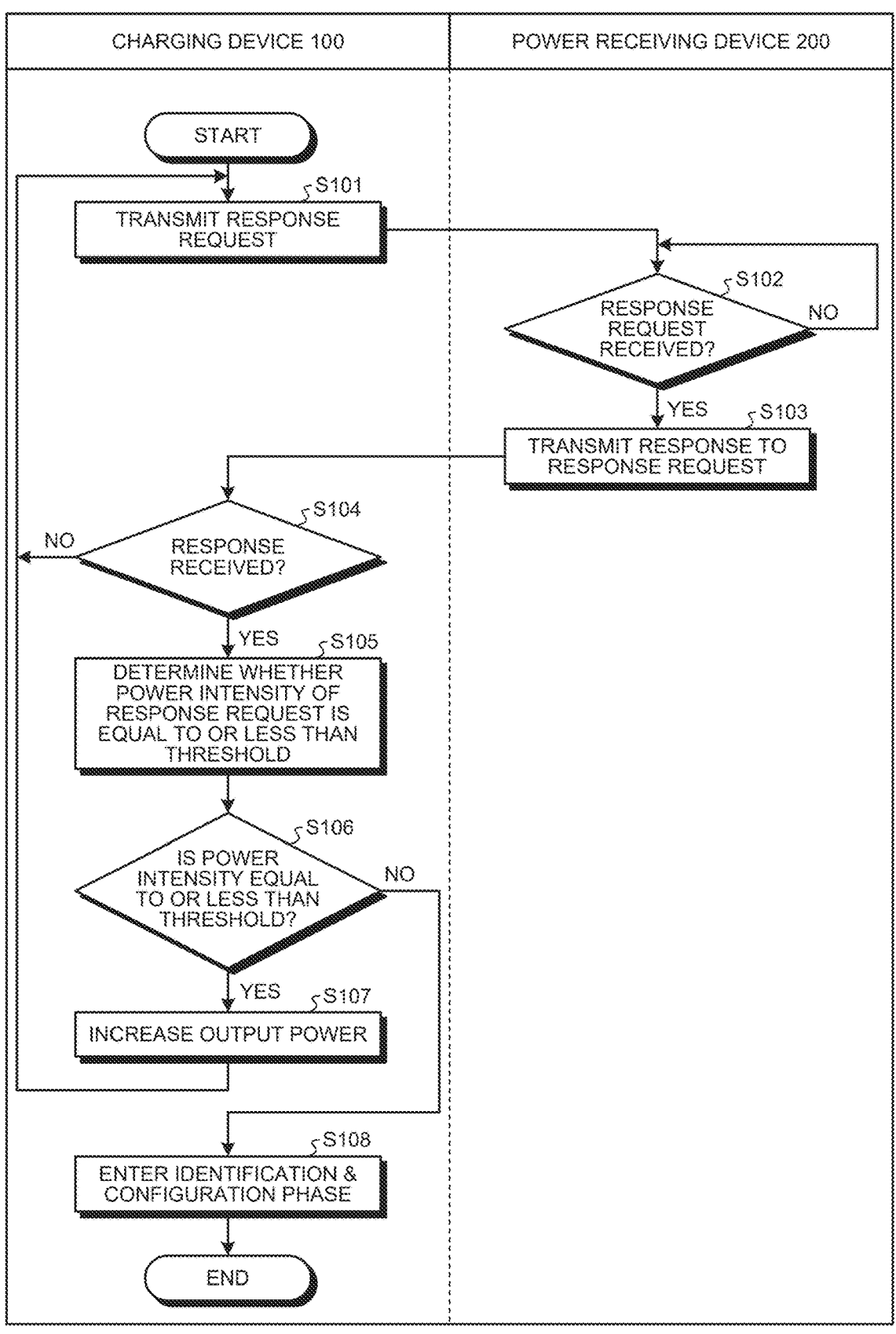
FIG. 7 is a flowchart illustrating a control process for transmission power according to the first embodiment of the embodiment.

Next, a procedure of a control process for transmission power according to the first embodiment will be described with reference to FIG. 7. FIG. 7 is a flowchart illustrating the control process for transmission power according to the first embodiment of the present embodiment.

First, as illustrated in FIG. 7, the transmission unit 110 of the charging device 100 transmits the response request for detecting the power receiving device 200 (Step S101). Note that the response request is a signal for detecting the power receiving device 200 but is not transmitted by specifying a specific power receiving device 200.

Next, when receiving no response request upon approaching the charging device 100 (Step S102: No), the power receiving device 200 further approaches the charging device 100 and waits for reception of the response request. On the other hand, when receiving the response request (Step S102: Yes), the power receiving device 200 transmits the response to the response request to the charging device 100 (Step S103). The response is the SSP and indicates the strength of the reception power upon receiving the response request by the power receiving device 200.

Next, when the reception unit 120 of the charging device 100 receives no response to the response request, from the power receiving device 200 within a certain time after the transmission of the response request (Step S104: No), the process returns to Step S101, and the response request is transmitted again by the transmission unit 110.

On the other hand, when the reception unit 120 receives the response to the response request, from the power receiving device 200 (Step S104: Yes), the determination unit 130 of the charging device 100 determines whether the power intensity of the response request received by the power receiving device 200 is equal to or less than the predetermined threshold, on the basis of the received response (Step S105).

When it is determined that the power intensity of the response request received by the power receiving device 200 is equal to or less than the predetermined threshold (Step S106: Yes), the power control unit 140 of the charging device 100 increases the output power (Step S107). After Step S107, the process returns to Step S101, and the response request is transmitted again by the transmission unit 110 by using the output power increased in Step S107.

On the other hand, when it is determined that the power intensity of the response request received by the power receiving device 200 is higher than the predetermined threshold (Step S106: No), the process enters the Identification & Configuration phase (Step S108). After Step S108, the present process illustrated in FIG. 7 ends, but entering the Identification & Configuration phase starts preparation for power transfer for supplying power to the power receiving device 200.

2.2. Second Embodiment

Next, the second embodiment of the present embodiment will be described. In the conventional contactless charging system, due to the accessory cover 500 or the like applied to the power receiving device 200, the charging device 100 cannot receive the SSP transmitted from the power receiving device 200, which would normally be received, and cannot detect the power receiving device 200, in some cases. Therefore, the charging device 100 does not start power supply to the power receiving device 200 and charging of the power receiving device 200 may not be normally performed, in some cases.

Therefore, in the second embodiment, the charging device 100 measures a Q factor (quality factor) of the power transmission coil 102. Therefore, when a change in the Q factor is detected, it is assumed that the power receiving device 200 is detected, even if no SSP is received from the power receiving device 200, and output power is increased until SSP is received.

Figure 8:
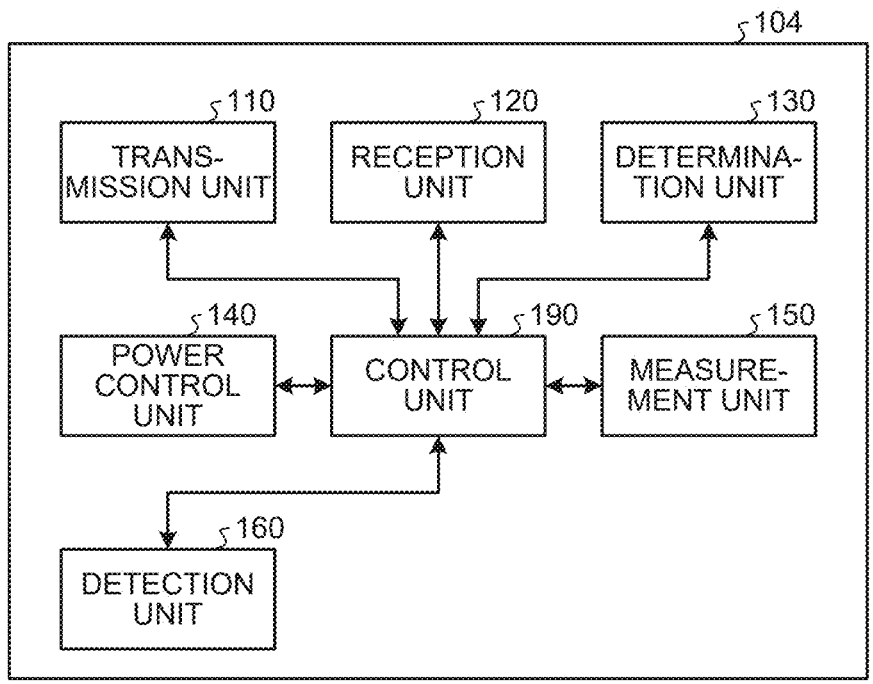
FIG. 8 is a block diagram illustrating an exemplary functional configuration of the microcomputer 104 according to a second embodiment of the embodiment.

FIG. 8 is a block diagram illustrating an exemplary functional configuration of the microcomputer 104 according to the second embodiment of the present embodiment. As illustrated in FIG. 8, the microcomputer 104 according to the second embodiment includes the transmission unit 110, the reception unit 120, the determination unit 130, the power control unit 140, a measurement unit 150, a detection unit 160, and the control unit 190 that controls each configuration included in the microcomputer 104.

(Transmission unit 110)

When the detection unit 160 detects the change in the Q factor measured by the measurement unit 150, from a predetermined reference value, the transmission unit 110 according to the second embodiment transmits the response request. In addition, when the transmission unit 110 receives no response to the response request from the power receiving device 200 within a certain time after the transmission of the response request, the power control unit 140 increases the output power and then transmits the response request again.

(Reception Unit 120)

Construction of the reception unit 120 according to the second embodiment is similar to that of the first embodiment.

(Determination Unit 130)

Construction of the determination unit 130 according to the second embodiment is similar to that of the first embodiment.

(Power Control Unit 140)

The power control unit 140 according to the second embodiment increases the output power, when the change in the Q factor measured by the measurement unit 150, from the predetermined reference value is detected by the detection unit 160 and no response to the response request is received from the power receiving device 200. This configuration makes it possible to increase the output power so that the charging of the power receiving device 200 is normally performed. In addition, the output power is increased upon change in the Q factor, suppressing unnecessary power consumption.

In addition, the power control unit 140 increases the output power, when the determination unit 130 determines that the power intensity of the response request received by the power receiving device 200, indicated by the response received by the reception unit 120, is equal to or less than the predetermined threshold. Control of the power control unit 140 is similar to that of the first embodiment, whereby it is possible to increase the output power up to power at which charging of the power receiving device 200 is normally performed.

(Measurement Unit 150)

The measurement unit 150 according to the second embodiment periodically measures the Q factor of the power transmission coil 102.

(Detection Unit 160)

The detection unit 160 according to the second embodiment detects the change in the Q factor measured by the measurement unit 150, from the predetermined reference value.

Figure 9:
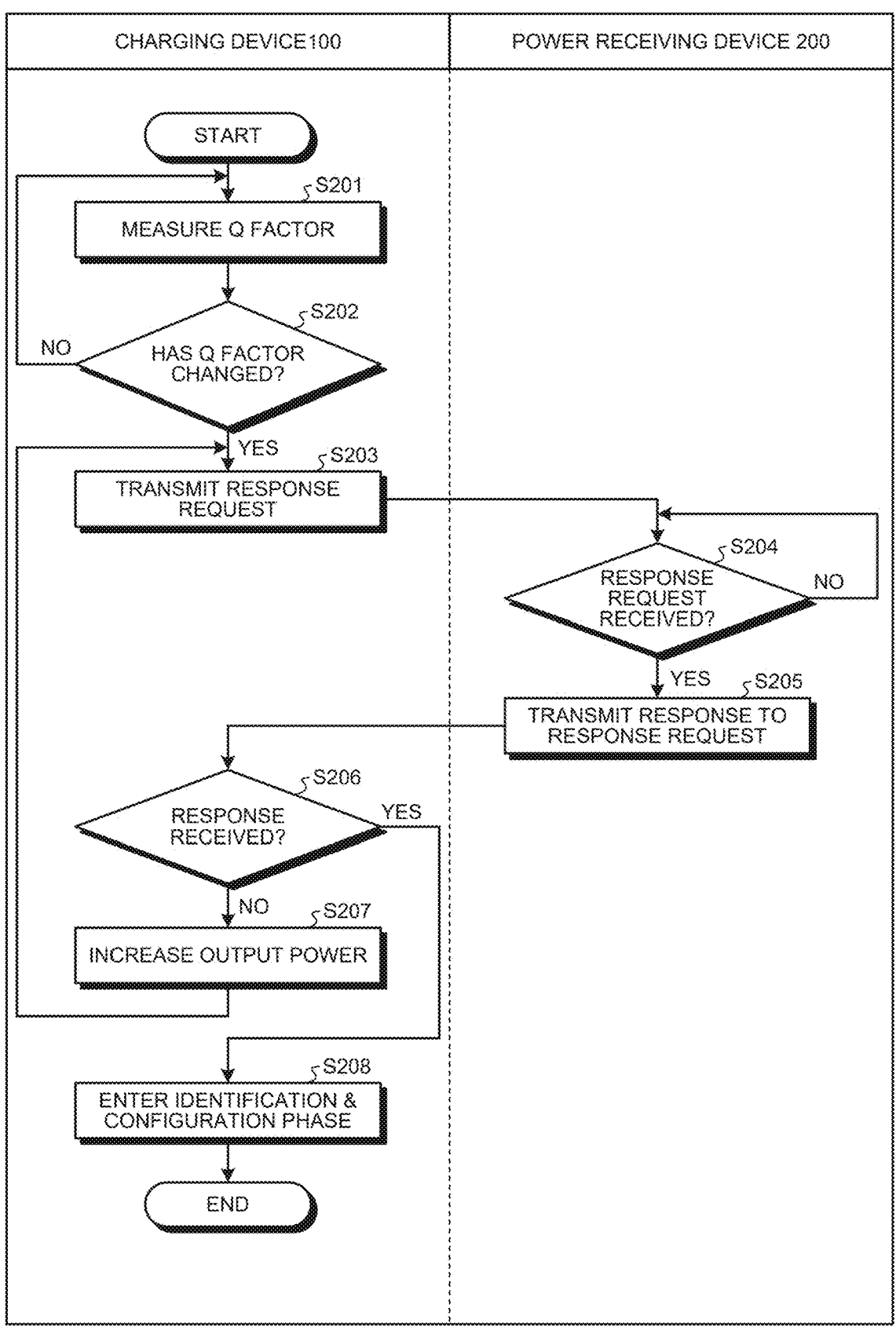
FIG. 9 is a flowchart illustrating a control process for transmission power according to the second embodiment of the embodiment.

Next, a procedure of a control process for transmission power according to the second embodiment will be described with reference to FIG. 9. FIG. 9 is a flowchart illustrating the control process for transmission power according to the second embodiment of the present embodiment.

First, as illustrated in FIG. 9, the measurement unit 150 of the charging device 100 measures the Q factor of the power transmission coil 102 (Step S201). When no change in the Q factor from the predetermined reference value is detected by the detection unit 160 of the charging device 100 (Step S202: No), the process returns to Step S201, and the Q factor is measured again by the measurement unit 150.

On the other hand, when the change in the Q factor measured by the measurement unit 150 is detected by the detection unit 160, from the predetermined reference value (Step S202: Yes), the transmission unit 110 of the charging device 100 transmits the response request for detecting the power receiving device 200 (Step S203). Note that the response request is a signal for detecting the power receiving device 200 but is not transmitted by specifying a specific power receiving device 200.

Next, when receiving no response request upon approaching the charging device 100 (Step S204: No), the power receiving device 200 further approaches the charging device 100 and waits for reception of the response request. On the other hand, when receiving the response request (Step S204: Yes), the power receiving device 200 transmits the response to the response request to the charging device 100 (Step S205). The response is the SSP and indicates the strength of the reception power upon receiving the response request by the power receiving device 200.

Next, when the reception unit 120 of the charging device 100 receives no response to the response request, from the power receiving device 200 within a certain time after the transmission of the response request (Step S206: No), the power control unit 140 of the charging device 100 increases the output power (Step S207). After Step S207, the process returns to Step S201, and the response request is transmitted again by the transmission unit 110 by using the output power increased in Step S207.

On the other hand, when the reception unit 120 receives the response to the response request from the power receiving device 200 (Step S206: Yes), the process enters the Identification & Configuration phase (Step S208). Note that when the response to the response request is received (Step S206: Yes), processing of Step S105 and subsequent steps of FIG. 7 according to the first embodiment can be performed instead of immediately entering the Identification & Configuration phase. Therefore, when it is determined that the reception power of the power receiving device 200 is not sufficient for charging, the output power of the charging device 100 can be increased.

2.3. Third Embodiment

Next, the third embodiment of the present embodiment will be described. In the second embodiment, when no response to the response request is received from the power receiving device 200 (Step S206: No), the output power is increased (Step S207), and then the response request is transmitted again (Step S203). Therefore, unless the response to the response request is received from the power receiving device 200, there is a possibility that the output power may keep increasing.

Therefore, in the third embodiment, when no response to the response request is received from the power receiving device 200, the charging device 100 increases the output power up to a predetermined threshold (corresponding to a first threshold) until receiving the response. In addition, after increasing the output power to the predetermined threshold, the charging device 100 reduces the output power to a predetermined threshold (corresponding to a second threshold) until receiving the response. Then, after the output power is reduced to the predetermined threshold, the output power is increased again until the response is received, and the output power is repeatedly increased and reduced between the second threshold and the first threshold until the response is received.

The functional configuration of the microcomputer 104 of the third embodiment is the same as that of the first embodiment, and each function of the third embodiment will be described with reference to the block diagram of FIG. 6.
(Transmission Unit 110)

Construction of the transmission unit 110 according to the third embodiment is similar to that of the first embodiment.
(Reception Unit 120)

Construction of the reception unit 120 according to the third embodiment is similar to that of the first embodiment.
(Determination Unit 130)

Construction of the determination unit 130 according to the third embodiment is similar to that of the first embodiment.
(Power Control Unit 140)

When no response to the response request from the power receiving device 200 is received, the power control unit 140 according to the third embodiment periodically increases the output power until receiving the response. In addition, when having increased the output power to the first threshold, the power control unit 140 periodically reduces the output power until receiving the response. Furthermore, when having reduced the output power to the second threshold, the power control unit 140 periodically increases the output power until receiving the response.

Note that in the power control unit 140, a determination may be made not until receiving the response but when the determination unit 130 determines that the power intensity of the response request received by the power receiving device 200, indicated by the response received by the reception unit 120, is equal to or less than the predetermined threshold. This configuration makes it possible to increase and reduce the output power up to power at which charging of the power receiving device 200 is normally performed.

Figure 10:
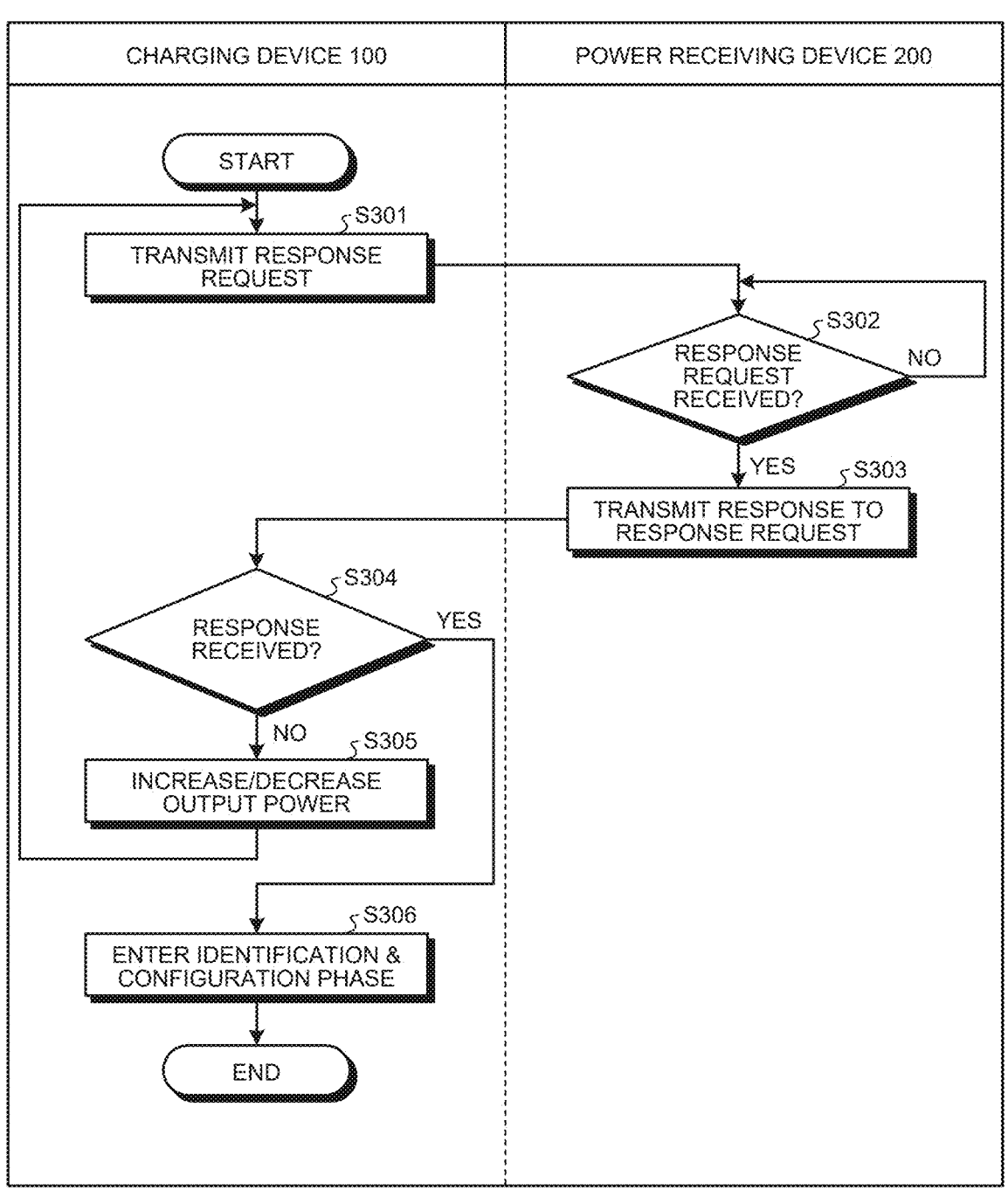
FIG. 10 is a flowchart illustrating a control process for transmission power according to the third embodiment of the embodiment.

Next, a procedure of a control process for transmission power according to the third embodiment will be described with reference to FIG. 10. FIG. 10 is a flowchart illustrating the control process for transmission power according to the third embodiment of the present embodiment.

Steps S301 to S303 illustrated in FIG. 10 are similar to Steps S101 to S103 of FIG. 7 according to the first embodiment.

Next, when the reception unit 120 of the charging device 100 receives no response to the response request, from the power receiving device 200 within a certain time after the transmission of the response request (Step S304: No), the power control unit 140 of the charging device 100 increases or decreases the output power (Step S305). In Step S305, the output power is increased and reduced at a predetermined rate by the power control unit 140 so that the increase and reduction of the output power is repeated between the predetermined second threshold and the first threshold. After Step S305, the process returns to Step S301, and the response request is transmitted again by the transmission unit 110 by using the output power increased and reduced in Step S305.

Note that, as described above, the power control unit 140 may make a determination not until receiving the response is received (Yes decision in Step S304) but when the determination unit 130 determines that the power intensity of the response request received by the power receiving device 200, indicated by the response received by the reception unit 120, is equal to or less than the predetermined threshold.

On the other hand, when the reception unit 120 receives the response to the response request from the power receiving device 200 (Step S304: Yes), the process enters the Identification & Configuration phase (Step S306). Note that when the response to the response request is received (Step S304: Yes), processing of Step S105 and subsequent steps of FIG. 7 according to the first embodiment can be performed, instead of immediately entering the Identification & Configuration phase. Therefore, when it is determined that the reception power of the power receiving device 200 is not sufficient for charging, the output power of the charging device 100 can be increased.

2.4. Fourth Embodiment

Next, the fourth embodiment of the present embodiment will be described. In a conventional FOD function, when a difference between the transmission power transmitted from the power transmission coil 102 and the reception power received by the power reception coil 201 is large, the charging device 100 consider that a metal foreign object is detected and does not start or stop charging. Therefore, when the accessory cover 500 is applied to the power receiving device 200, the difference between the transmission power and the reception power becomes large, application of the accessory cover 500 is erroneously detected as the presence of a foreign object, and charging by the charging device 100 may not be normally performed.

Therefore, in the fourth embodiment, when detecting the application of the accessory cover 500, the power receiving device 200 considers the application of the accessory cover 500 in addition to the reception power indicated as the response to the response request from the charging device 100, for presentation to the charging device 100.

Figure 11:
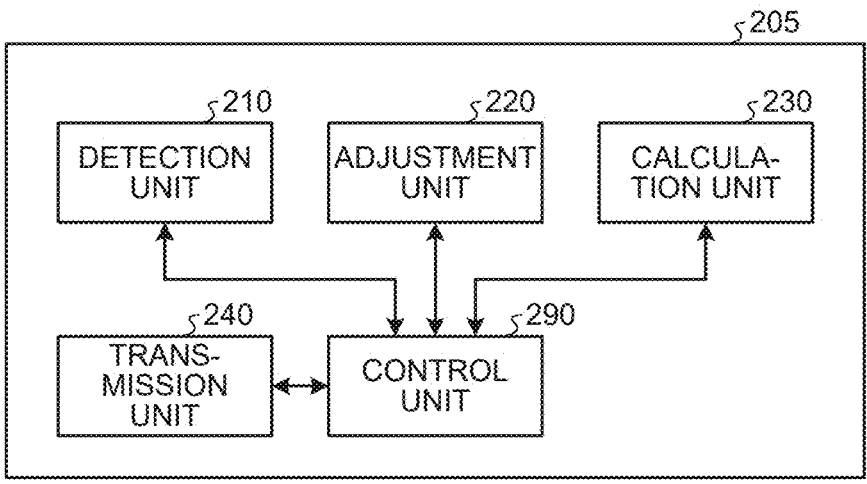
FIG. 11 is a block diagram illustrating an exemplary functional configuration of a microcomputer 205 according to a fourth embodiment of the embodiment.

FIG. 11 is a block diagram illustrating an exemplary functional configuration of the microcomputer 205 according to the fourth embodiment of the present embodiment. As illustrated in FIG. 11, the microcomputer 205 according to the fourth embodiment includes a detection unit 210, an adjustment unit 220, a calculation unit 230, a transmission unit 240, and a control unit 290 that controls each configuration included in the microcomputer 205.
(Detection unit 210)

The detection unit 210 according to the fourth embodiment detects application of the accessory cover 500 to the power receiving device 200. For detection of the accessory cover 500, an electrical method, a mechanical method, or the like using a detection component included in the accessory cover 500 is used. More specifically, for example, a signal line level that changes from H to L is detected by electrically connecting a signal line of the detection unit 210 to a signal line of the accessory cover 500 via a metal contact or a connector. Alternatively, the signal line level that changes from H to L is detected by moving a reed switch of the detection unit 210 closer to a magnet included in the accessory cover 500. Alternatively, the application of the accessory cover 500 is detected, such as by pressing a mechanism switch of the detection unit 210 by a mechanical protrusion of the accessory cover 500.

(Adjustment Unit 220)

When the application of the accessory cover 500 is detected by the detection unit 210, the adjustment unit 220 according to the fourth embodiment adjusts an FOD parameter so as not to erroneously detect a state where the accessory cover 500 is applied, as the presence of the foreign object. More specifically, for example, the FOD parameter used when the application of the accessory cover 500 is detected is changed. Accordingly, when the application of the accessory cover 500 is detected, the difference between the transmission power increased due to the application of the accessory cover 500 and the reception power can be adjusted.

(Calculation Unit 230)

The calculation unit 230 according to the fourth embodiment calculates the reception power that is presented to the charging device, on the basis of the FOD parameter. Accordingly, when the application of the accessory cover 500 is detected, the calculation unit 230 calculates the reception power obtained by adding power lost due to the application of the accessory cover 500.

(Transmission Unit 240)

The transmission unit 240 according to the fourth embodiment transmits the reception power calculated by the calculation unit 230, to the charging device 100.

Figure 12:
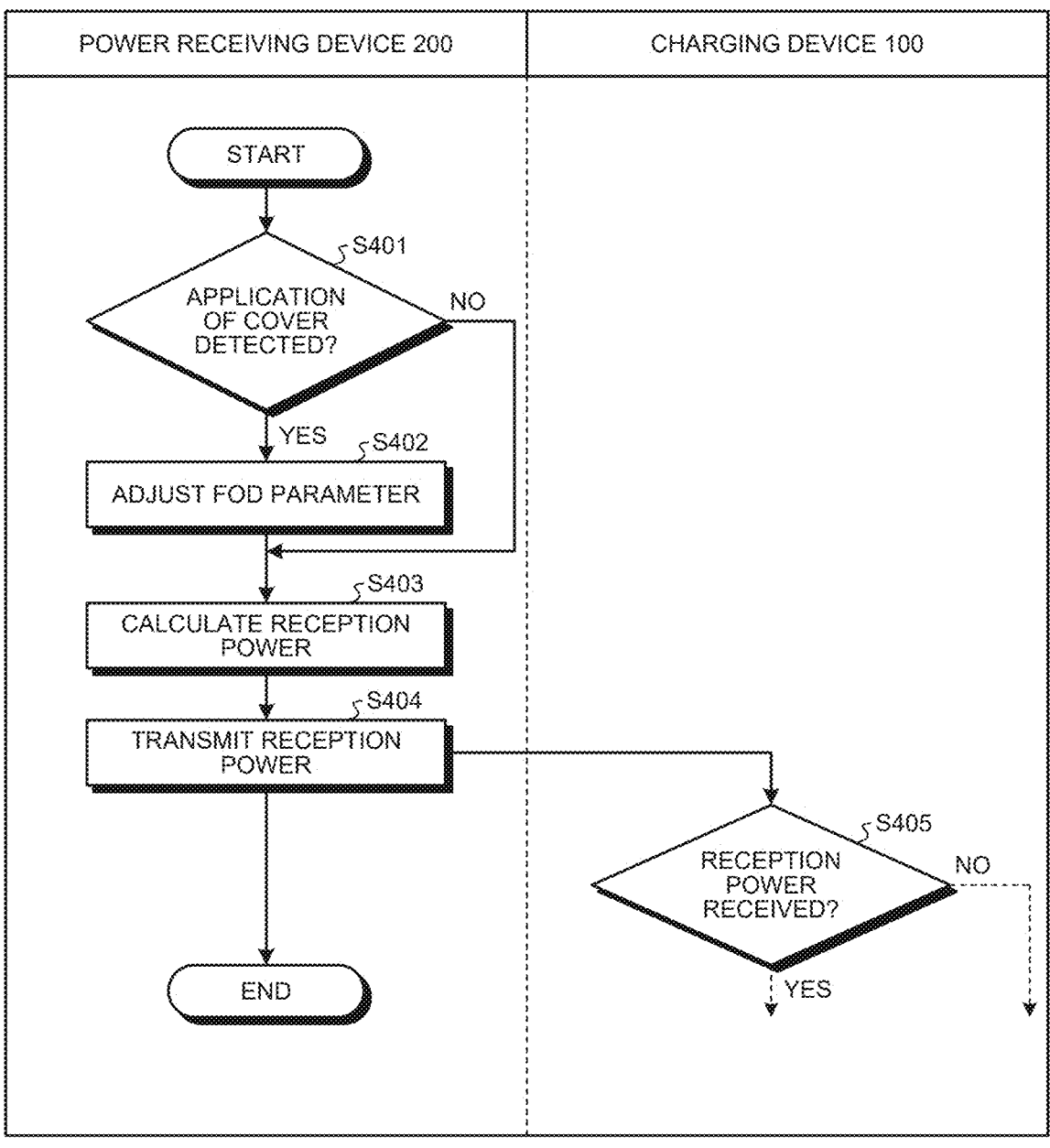
FIG. 12 is a flowchart illustrating a control process for reception power according to the fourth embodiment of the embodiment.

Next, a procedure of a control process for reception power according to the fourth embodiment will be described with reference to FIG. 12. FIG. 12 is a flowchart illustrating a control process for reception power according to the fourth embodiment of the present embodiment.

First, as illustrated in FIG. 12, when the application of the accessory cover 500 is detected by the detection unit 210 of the power receiving device 200 (Step S401: Yes), the adjustment unit 220 of the power receiving device 200 adjusts the FOD parameter so as not to erroneously detect the state where the accessory cover 500 is applied, as presence of the foreign object (Step S402).

On the other hand, when the application of the accessory cover 500 is not detected by the detection unit 210 of the power receiving device 200 (Step S401: No), the process proceeds to Step S403 without performing Step S402.

Next, the calculation unit 230 of the power receiving device 200 calculates the reception power presented to the charging device, on the basis of the FOD parameter (Step S403). When the application of the accessory cover 500 is detected, the FOD parameter used here is an FOD parameter that is adjusted by the adjustment unit 220.

Next, the transmission unit 240 of the power receiving device 200 transmits the reception power calculated by the calculation unit 230 to the charging device 100, as the response to the response request from the charging device 100 (Step S404).

Next, the reception unit 120 of the charging device 100 determines whether the reception power from the power receiving device 200 is received (Step S405). Step S405 is, for example, a similar decision to Step S104 in FIG. 7 according to the first embodiment, and Step S101 or Step S105 and subsequent steps are performed according to a decision result, as illustrated in FIG. 7.

In other words, although the charging device 100 according to the fourth embodiment does not recognize the application of the accessory cover 500, the application of the accessory cover 500 is taken into consideration in addition to the reception power of the power receiving device 200, and therefore, it is possible to suppress erroneous detection of the state where the accessory cover 500 is applied, as the presence of the foreign object. <<2.5. Fifth Embodiment>>

Next, the fifth embodiment of the present embodiment will be described. In the fourth embodiment, since the accessory cover 500 needs to include the detection component, the application of the accessory cover 500 cannot be detected for a commercially available cover or the like that does not include the detection component.

Therefore, in the fifth embodiment, a user of the power receiving device 200 is caused to input the application/non-application of the accessory cover 500 via a user interface (UI) displayed on the power receiving device 200.

Figure 13:
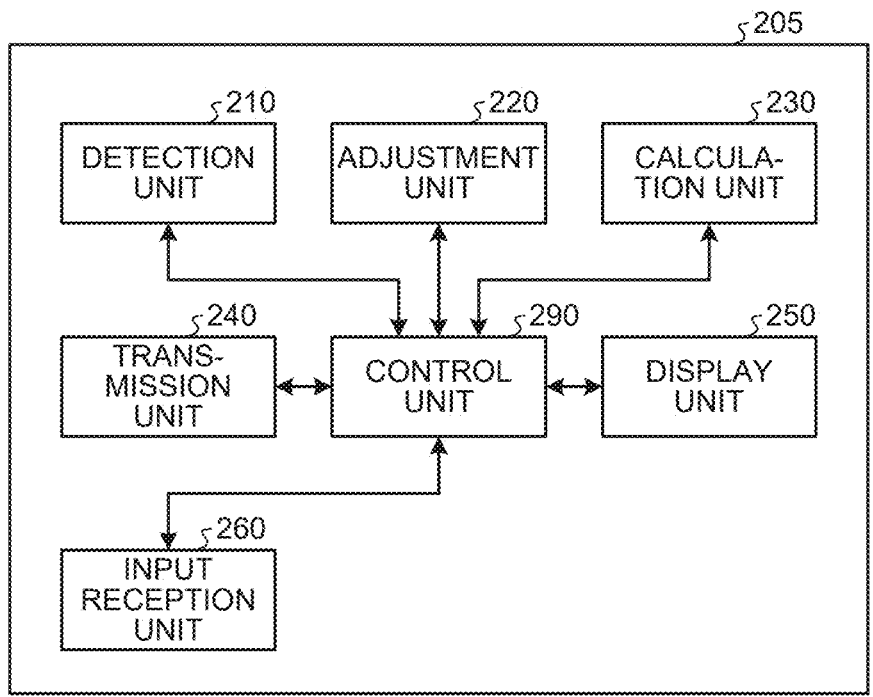
FIG. 13 is a block diagram illustrating an exemplary functional configuration of the microcomputer 205 according to a fifth embodiment of the embodiment.

FIG. 13 is a block diagram illustrating an exemplary functional configuration of the microcomputer 205 according to the fifth embodiment of the present embodiment. As illustrated in FIG. 13, the microcomputer 205 according to the fifth embodiment includes the detection unit 210, the adjustment unit 220, the calculation unit 230, the transmission unit 240, a display unit 250, an input reception unit 260, and the control unit 290 that controls each configuration included in the microcomputer 205.

(Detection Unit 210)

When the input representing the application/non-application of the accessory cover 500, received by the input reception unit 260 indicates that the accessory cover 500 is applied, the detection unit 210 according to the fifth embodiment detects that the accessory cover 500 is applied to the power receiving device 200.

(Adjustment Unit 220)

Construction of the adjustment unit 220 according to the fifth embodiment is similar to that of the fourth embodiment.

(Calculation Unit 230)

Construction of the calculation unit 230 according to the fifth embodiment is similar to that of the fourth embodiment.

(Transmission Unit 240)

Construction of the transmission unit 240 according to the fifth embodiment is similar to that of the fourth embodiment.

(Display Unit 250)

The display unit 250 according to the fifth embodiment displays the UI for input of the application/non-application of the accessory cover 500. The UI is downloaded and installed on the power receiving device 200 in advance from, for example, a web site of a manufacturer of the charging device 100.

(Input Reception Unit 260)

The input reception unit 260 according to the fifth embodiment receives an input of the application/non-application of the accessory cover 500, input via the UI displayed on the display unit 250. This means, for example, acquiring an input value indicating the application/non-application of the accessory cover 500, selected by the user via the UI displayed on the display unit 250.

Figure 14:
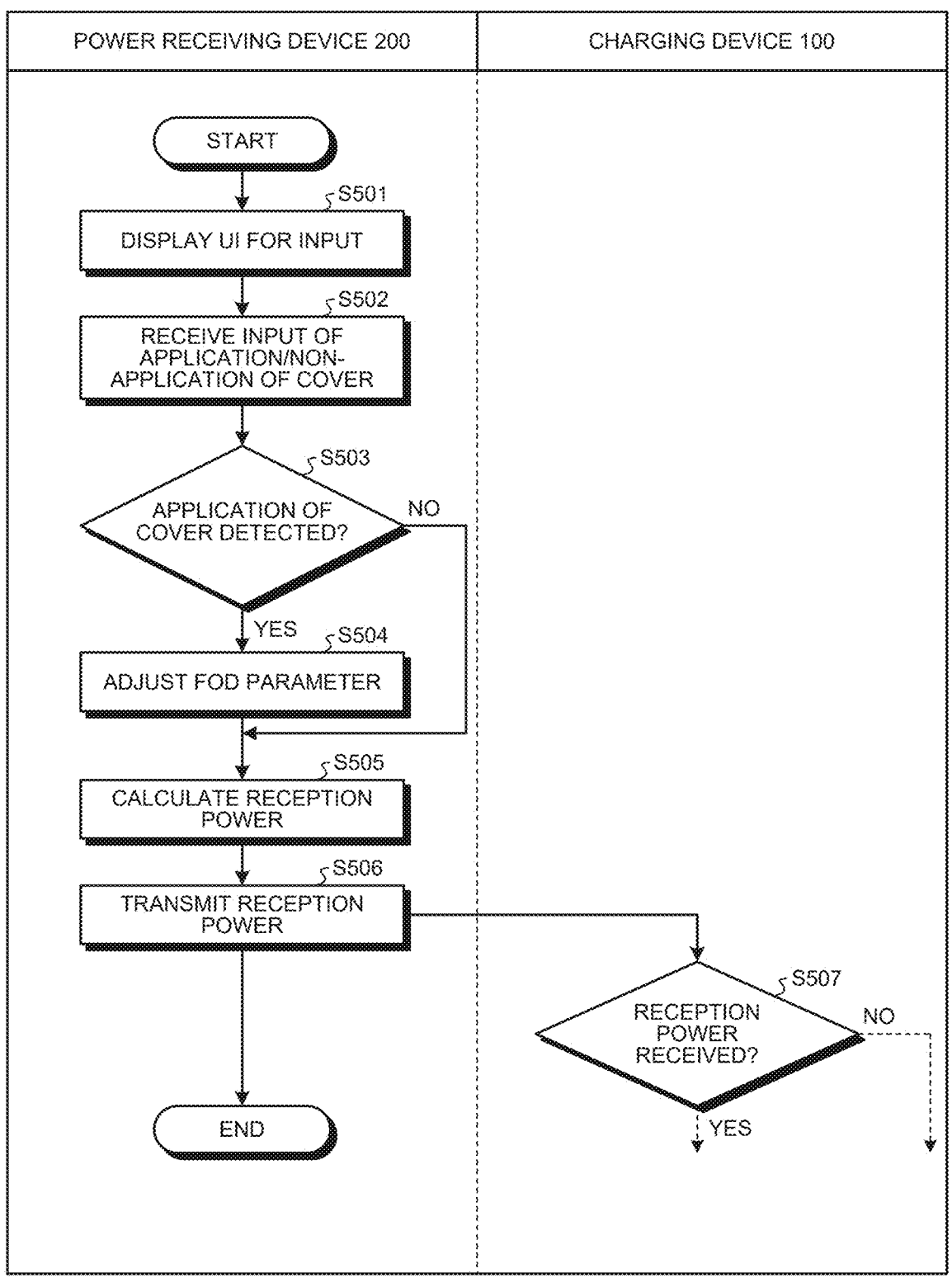
FIG. 14 is a flowchart illustrating a control process for reception power according to the fifth embodiment of the embodiment.

Next, a procedure of a control process for reception power according to the fifth embodiment will be described with reference to FIG. 14. FIG. 14 is a flowchart illustrating the control process for reception power according to the fifth embodiment of the present embodiment.

First, as illustrated in FIG. 14, the display unit 250 of the power receiving device 200 displays the UI for input of the application/non-application of the accessory cover 500, in response to, for example, a request from the user (Step S501).

Next, the input reception unit 260 of the power receiving device 200 receives the input of the application/non-application of the accessory cover 500, input via the UI displayed on the display unit 250 (Step S502).

Next, the detection unit 210 of the power receiving device 200 determines whether the application of the accessory cover 500 to the power receiving device 200 is detected, on the basis of the input of the application/non-application of the accessory cover 500, received by the input reception unit 260 (Step S503). Step S503 and subsequent steps are similar decisions to Step S401 and subsequent steps of FIG. 12 according to the fourth embodiment.

2.6. Sixth Embodiment

Next, the sixth embodiment of the present embodiment will be described. In the fourth embodiment and the fifth embodiment, when the power receiving device 200 detects the application of the accessory cover 500, the FOD parameter is adjusted by the power receiving device 200, and the reception power is calculated in consideration of the application of the accessory cover 500.

In contrast to these embodiments, in the sixth embodiment, when the power receiving device 200 detects the application of the accessory cover 500, the power receiving device 200 does not adjust the FOD parameter but the charging device 100 adjusts an FOD threshold.

Figure 15:
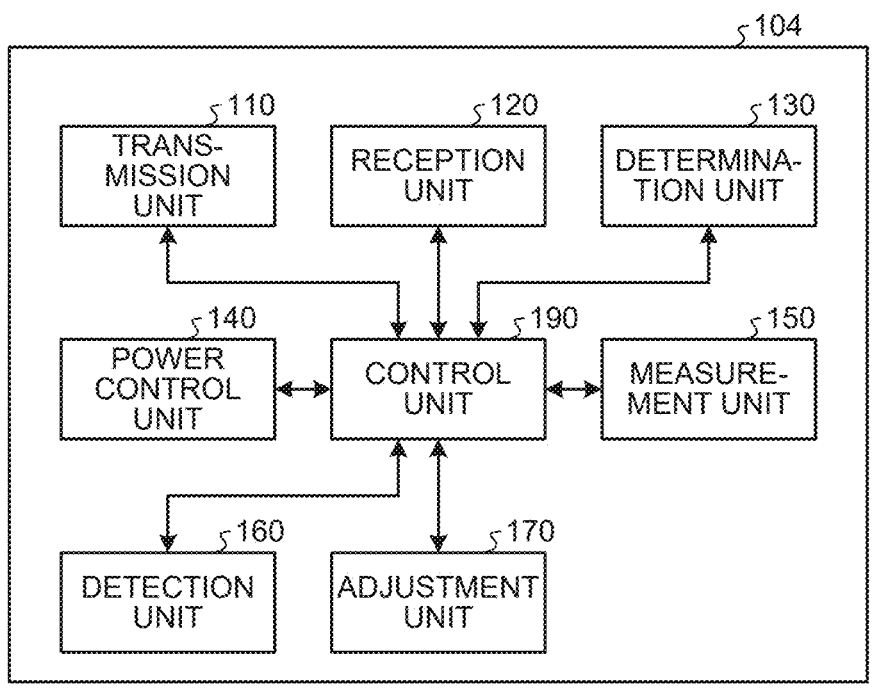
FIG. 15 is a block diagram illustrating an exemplary functional configuration of the microcomputer 104 according to a sixth embodiment of the embodiment.

FIG. 15 is a block diagram illustrating an exemplary functional configuration of the microcomputer 104 according to the sixth embodiment of the present embodiment. As illustrated in FIG. 15, the microcomputer 104 according to the sixth embodiment includes the transmission unit 110, the reception unit 120, the determination unit 130, the power control unit 140, the measurement unit 150, the detection unit 160, an adjustment unit 170, and the control unit 190 that controls each configuration included in the microcomputer 104.

(Transmission Unit 110)

The transmission unit 110 according to the sixth embodiment can adopt functions similar to those of the first embodiment or second embodiment.

(Reception Unit 120)

The reception unit 120 according to the sixth embodiment receives a notification indicating that the accessory cover 500 is applied to the power receiving device 200, from the power receiving device 200.

(Determination Unit 130)

The determination unit 130 according to the sixth embodiment can adopt functions similar to those of the first embodiment or second embodiment.

(Power Control Unit 140)

The power control unit 140 according to the sixth embodiment can adopt functions similar to those of the first embodiment or second embodiment.

(Measurement Unit 150)

Construction of the measurement unit 150 according to the sixth embodiment is similar to that of the second embodiment. In the sixth embodiment, in a case where the Q factor of the power transmission coil 102 is not measured, the microcomputer 104 may not include the measurement unit 150.

(Detection Unit 160)

Construction of the detection unit 160 according to the sixth embodiment is similar to that of the second embodiment. In the sixth embodiment, in a case where the change in the Q factor of the power transmission coil 102 is not detected, the microcomputer 104 may not include the detection unit 160.

(Adjustment Unit 170)

When the reception unit 120 receives the notification indicating that the accessory cover 500 is applied to the power receiving device 200, the adjustment unit 170 according to the sixth embodiment adjusts the FOD threshold so as not to erroneously detect the state where the accessory cover 500 is applied, as the presence of the foreign object. The FOD threshold is a threshold for a difference between the transmission power and the reception power, for detecting the metal foreign object.

Therefore, when the notification indicating that the accessory cover 500 is applied is received from the power receiving device 200, the adjustment unit 170 adjusts the FOD threshold so as not to erroneously detect the state where the accessory cover 500 is applied, as the presence of the foreign object, even if the difference between the transmission power and the reception power is somewhat large. However, such adjustment of the FOD threshold also has a disadvantage that detection of a true foreign object is made difficult.

Figure 16:
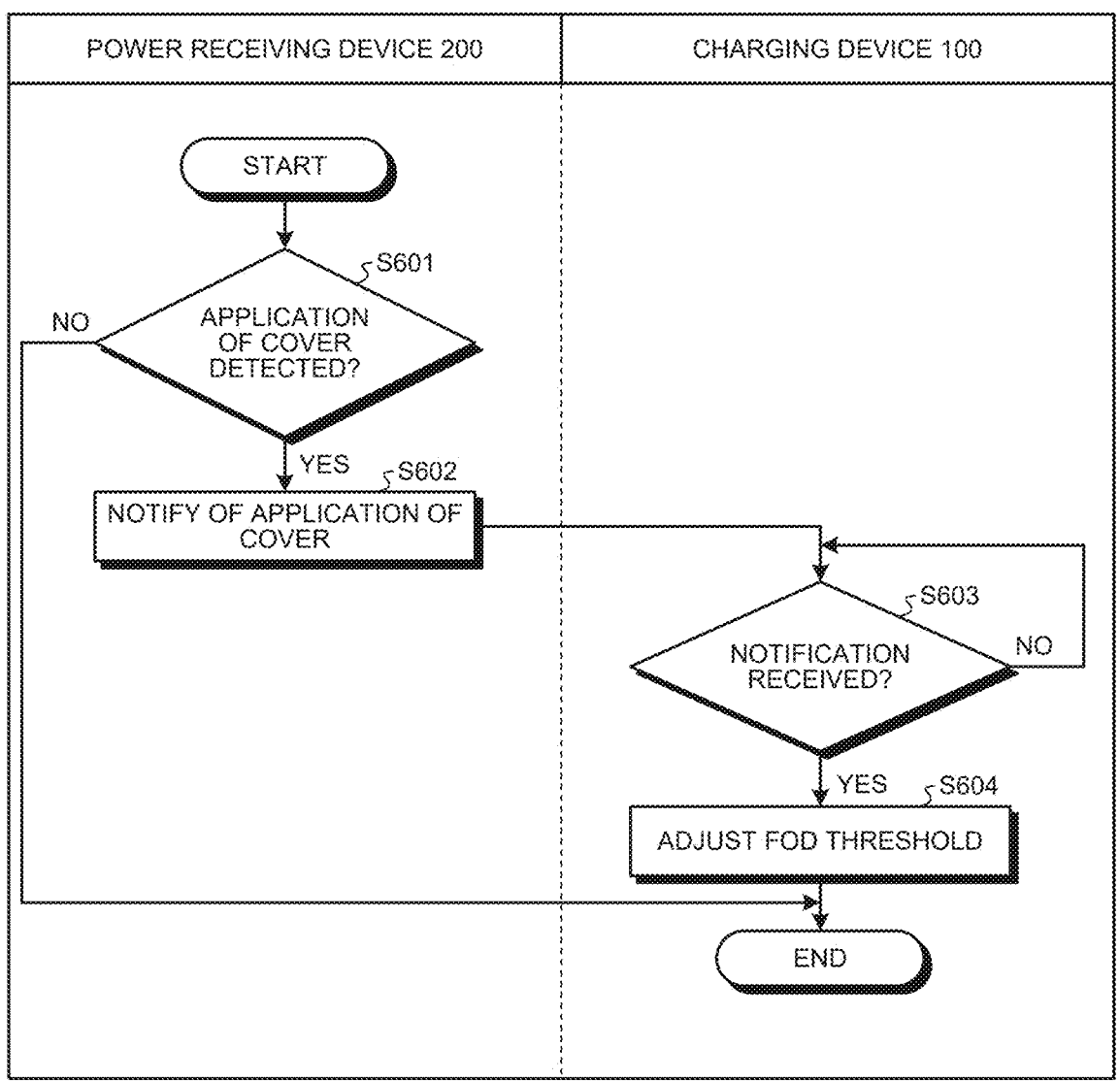
FIG. 16 is a flowchart illustrating a control process for an FOD function according to the sixth embodiment of the embodiment.

Next, a procedure of a control process for an FOD function according to the sixth embodiment will be described with reference to FIG. 16. FIG. 16 is a flowchart illustrating the control process for an FOD function according to the sixth embodiment of the present embodiment.

First, as illustrated in FIG. 16, the power receiving device 200 determines whether the application of the accessory cover 500 to the power receiving device 200 is detected (Step S601). Step S601 is similar to Step S401 of FIG. 12 according to the fourth embodiment or Step S503 of FIG. 14 according to the fifth embodiment. In other words, the process of the sixth embodiment can be performed as a process subsequent to the decision of whether the application of the accessory cover 500 according to the fourth or fifth embodiment is detected.

When the application of the accessory cover 500 to the power receiving device 200 is not detected (Step S601: No), the present process illustrated in FIG. 16 ends. On the other hand, when the application of the accessory cover 500 to the power receiving device 200 is detected (Step S601: Yes), the power receiving device 200 transmits the notification indicating that the accessory cover 500 is applied, to the charging device 100 (Step S602).

Next, when no notification indicating that the accessory cover 500 is applied is received (Step S603: No), the reception unit 120 of the charging device 100 waits for reception of the notification.

On the other hand, when the notification indicating that the accessory cover 500 is applied is received (Step S603: Yes), the adjustment unit 170 of the charging device 100 adjusts the FOD threshold so as not to erroneously detect the state where the accessory cover 500 is applied, as the presence of the foreign object (Step S604). After Step S604, the present process illustrated in FIG. 16 ends.

3. Exemplary Hardware Configuration

Finally, an exemplary hardware configuration of the power receiving device 200 according to an embodiment of the present disclosure will be described. FIG. 17 is a block diagram illustrating the exemplary hardware configuration of the power receiving device 200 according to an embodiment of the present disclosure. Referring to FIG. 17, the power receiving device 200 includes, for example, a processor 871, a read only memory (ROM) 872, a random access memory (RAM) 873, a host bus 874, a bridge 875, an external bus 876, an interface 877, an input device 878, an output device 879, a storage 880, a drive 881, a connection port 882, and a communication device 883. Note that the hardware configuration shown here is merely an example, and some of the component elements may be omitted. In addition, a component element other than the component elements shown here may be further included.

(Processor 871)

The processor 871, for example, functions as an arithmetic processing device or a control device, and controls all or part of the operation of each component element, on the basis of various programs recorded in the ROM 872, the RAM 873, the storage 880, or a removable recording medium 901. As a matter of course, the processor 871 may be configured by a plurality of processors.

(ROM 872, RAM 873)

The ROM 872 is a unit that stores a program read by the processor 871, data used for calculation, and the like. The RAM 873 temporarily or permanently stores, for example, a program read by the processor 871, various parameters appropriately changing upon running the program, and the like.

(Host Bus 874, Bridge 875, External Bus 876, and Interface 877)

The processor 871, the ROM 872, and the RAM 873 are mutually connected, for example, via the host bus 874 configured to transmit data at high speed. Meanwhile, the host bus 874 is connected to, for example, the external bus 876 configured to transmit data at relatively low speed, via the bridge 875. In addition, the external bus 876 is connected to various component elements via the interface 877.

(Input Device 878)

For the input device 878, for example, a mouse, a keyboard, a touch panel, a button, a switch, a lever, and the like are used. Furthermore, for the input device 878, a remote controller configured to transmit a control signal by using infrared ray or another radio wave is sometimes used. Furthermore, the input device 878 includes a sound input device such as a microphone and a sensor device such as an acceleration sensor and a gyro sensor.

(Output Device 879)

The output device 879 is a device that is configured to visually or audibly notify the user of acquired information, for example, a display device such as a cathode ray tube (CRT), LCD, or organic EL, an audio output device such as a speaker or headphone, a printer, a mobile phone, or a facsimile. Furthermore, the output device 879 according to the present disclosure includes various vibrating devices configured to output tactile stimulation.

(Storage 880)

The storage 880 is a device for storing various data. The storage 880 employs, for example, a magnetic storage device such as a hard disk drive (HDD), a semiconductor storage device, an optical storage device, a magneto-optical storage device, or the like.

(Drive 881)

The drive 881 is, for example, a device that reads information recorded on the removable recording medium 901 such as a magnetic disk, optical disk, magneto-optical disk, or semiconductor memory, or a device that writes information in the removable recording medium 901.

(Connection Port 882)

The connection port 882 is, for example, a universal serial bus (USB) port, an IEEE1394 port, a small computer system interface (SCSI), an RS-232C port, or a port for connecting an external connection device 902 such as optical audio terminal.

(Communication Device 883)

The communication device 883 is a communication device for connection to a network, and is, for example, a communication card for wired or wireless LAN, Bluetooth (registered trademark), or wireless USB (WUSB), an optical communication router, an Asymmetric Digital Subscriber Line (ADSL) router, various communication modems, or the like.

(Removable Recording Medium 901)

The removable recording medium 901 is, for example, a DVD medium, a Blu-ray (registered trademark) medium, an HD DVD medium, various semiconductor storage media, or the like. As a matter of course, the removable recording medium 901 may be, for example, an IC card with a non-contact IC chip, an electronic device, or the like.

(External Connection Device 902)

The external connection device 902 is, for example, a printer, a portable music player, a digital camera, a digital camcorder, an IC recorder, or the like.

Note that the memory 207 of the power receiving device 200 according to the present embodiment is implemented by a ROM 802, the RAM 803, and a storage 810. In addition, the control unit 290 of the microcomputer 205 of the power receiving device 200 according to the present embodiment, implemented by a processor 801, reads control programs implementing the detection unit 210, the adjustment unit 220, the calculation unit 230, the transmission unit 240, the display unit 250, the input reception unit 260, and the like from the ROM 802, the RAM 803, and the like, and executes the control programs. Furthermore, the transmission unit 240 according to the present embodiment is implemented by a communication device 813, and transmits data to an external device via a host bus 804, a bridge 805, an external bus 806, and an interface 807.

4. Conclusion

As described above, the charging device 100 includes: the transmission unit 110 that periodically transmits the response request;

the reception unit 120 that receives the response to the response request from the power receiving device;

the determination unit 130 that determines whether the power intensity of the response request received by the power receiving device 200, indicated by the response to the response request, is equal to or less than the predetermined threshold; and the power control unit 140 that increases the output power when it is determined that the power intensity is equal to or less than the predetermined threshold.

This configuration makes it possible for the charging device 100 to normally perform the contactless charging even when the reception power of the power receiving device 200 decreases due to application of the accessory cover 500 to the power receiving device 200.

Furthermore, the charging device 100 includes: the measurement unit 150 that periodically measures the Q factor of the coil;

the detection unit 160 that detects a change in the Q factor from the predetermined reference value;

the transmission unit 110 that transmits the response request when the change in the Q factor from the predetermined reference value is detected;

the reception unit 120 that receives the response to the response request, from the power receiving device 200; and the power control unit 140 that increases the output power when the change in the Q factor from the predetermined reference value is detected and no response to the response request is received.

This configuration makes it possible for the charging device 100 to detect the power receiving device 200 due to the change in the Q factor and normally perform the contactless charging, even when no SSP from the power receiving device 200 is received due to application of the accessory cover 500 to the power receiving device 200.

Furthermore, the charging device 100 includes:

the transmission unit 110 that periodically transmits the response request;

the reception unit 120 that receives the response to the response request from the power receiving device; and the power control unit 140 that periodically increases the output power until receiving the response to the response request, when no response to the response request is received, that periodically reduces the output power until receiving the response to the response request, when having increased the output power to the first threshold, that periodically increases the output power until receiving the response to the response request, when having reduced the output power to the second threshold.

This configuration makes it possible for the charging device 100 the charging device 100 to avoid the problem that the output power keeps increasing, while normally performing the contactless charging even when the reception power of the power receiving device 200 decreases due to the application of the accessory cover 500 to the power receiving device 200.

Furthermore, the power receiving device 200 includes:

the detection unit 210 that detects application of the accessory cover 500;

the adjustment unit 220 that when the application of the accessory cover 500 is detected adjusts the FOD parameter so as not to erroneously detect the state where the application of the accessory cover 500, as the presence of the foreign object;

the calculation unit 230 that calculates the reception power presented to the charging device 100 on the basis of the FOD parameter; and the transmission unit 240 that transmits the reception power to the charging device 100.

This configuration makes it possible for the power receiving device 200 to normally perform the contactless charging without erroneously detecting the state where the accessory cover 500 is applied, as the presence of the foreign object.

Furthermore, the power receiving device 200 includes:

the display unit 250 that displays the UI for input of the application/non-application of the accessory cover 500;

the input reception unit 260 that receives an input of the application/non-application of the accessory cover 500 input via the UI;

the detection unit 210 that detects the application of the accessory cover 500, when the input of the application/non-application of the accessory cover 500 indicates the application of the accessory cover 500;

the adjustment unit 220 that when the application of the accessory cover 500 is detected, adjusts the FOD parameter so as not to erroneously detect the state where the accessory cover 500 is applied, as the presence of the foreign object;

the calculation unit 230 that calculates the reception power presented to the charging device, on the basis of the FOD parameter; and the transmission unit 240 that transmits the reception power to the charging device 100.

This configuration makes it possible for the power receiving device 200 to normally perform the contactless charging without erroneously detecting the state where the accessory cover 500 is applied, as the presence of the foreign object, even when the accessory cover 500 does not include the detection component.

Furthermore, the charging device 100 includes:

the reception unit 120 that receives the notification indicating that the accessory cover 500 is applied to the power receiving device 200, from the power receiving device 200; and the adjustment unit 170 that when the notification indicating that the accessory cover 500 is applied is received, adjusts the FOD threshold so as not to erroneously detect the state where the accessory cover 500 is applied, as the presence of the foreign object.

This configuration makes it possible for the charging device 100 to normally perform the contactless charging without erroneously detecting the state where the accessory cover 500 is applied, as the presence of the foreign object.

Preferred embodiments of the present disclosure have been described above in detail with reference to the accompanying drawings, but the technical scope of the present disclosure is not limited to these examples. A person skilled in the art may obviously find various alternations and modifications within the technical concept described in claims, and it should be understood that the alternations and modifications will naturally come under the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

REFERENCE SIGNS LIST

3 DC POWER SUPPLY
100 CHARGING DEVICE
101 SWITCHING CIRCUIT
102 POWER TRANSMISSION COIL
103 COMMUNICATION DATA DEMODULATION CIRCUIT
104 MICROCOMPUTER
105 MEMORY
110 TRANSMISSION UNIT
120 RECEPTION UNIT
130 DETERMINATION UNIT
140 POWER CONTROL UNIT
150 MEASUREMENT UNIT
160 DETECTION UNIT
170 ADJUSTMENT UNIT
190 CONTROL UNIT
200 POWER RECEIVING DEVICE
201 POWER RECEPTION COIL
202 RECTIFIER CIRCUIT
203 LDO
204 COMMUNICATION DATA MODULATION CIRCUIT
205 MICROCOMPUTER
206 CHARGING CIRCUIT

207 MEMORY
208 SECONDARY BATTERY
210 DETECTION UNIT
220 ADJUSTMENT UNIT
230 CALCULATION UNIT
240 TRANSMISSION UNIT
250 DISPLAY UNIT
260 INPUT RECEPTION UNIT
290 CONTROL UNIT
500 ACCESSORY COVER

The invention claimed is:

1. A charging device comprising:
circuitry configured to
periodically transmit a response request;
receive a response to the response request from a power receiving device;
under a condition the response is not received, periodically increase output power until the response is received;
under another condition in which the output power has been increased to a first threshold, periodically reduce the output power until the response is received;
under a further condition in which the output power is reduced to a second threshold, periodically increase the output power until the response is received;
determine whether power intensity of the response request received by the power receiving device, indicated by the response, is equal to or less than a predetermined threshold; and
periodically increase or decrease the output power until the response is received that indicates the power intensity higher than the predetermined threshold.

2. The charging device according to claim 1, wherein the response is a signal strength packet (SSP).

3. The charging device according to claim 1, wherein the circuitry is configured to extract a signal strength value from the response.

4. A wireless charging system comprising:
a power receiving device; and
a charging device, wherein
the power receiving device includes circuitry configured to detect application of an accessory cover,
under a condition the application of the accessory cover is detected, adjust a foreign object detection (FOD) parameter,
calculate reception power based on the FOD parameter, and
convey the reception power to the charging device; and
the charging device includes circuitry configured to
receive the reception power from the power receiving device,
determine whether a power intensity indicated by the reception power is equal to or less than a predetermined threshold, and
periodically increase or decrease an output power until the received reception power indicates the power intensity higher than the predetermined threshold.

5. The wireless charging system of claim 4, wherein the circuitry of the power receiving device is configured to adjust the FOD parameter so as not to erroneously detect a state where the accessory cover is applied but recognized as a foreign object.

6. The wireless charging system according to claim 4, wherein the reception power is conveyed in a signal strength packet (SSP).

7. The wireless charging system according to claim 4, wherein the circuitry of the charging device is configured to extract a signal strength value from the reception power.

8. The wireless charging system according to claim 4, wherein the circuitry of the power receiving device is configured to calculate the reception power by adding an offset value to a measured power value, the offset value being determined based on the FOD parameter.

9. The wireless charging system according to claim 4, wherein the circuitry of the power receiving device is configured to convey the reception power to the charging device at a periodic interval during a power transfer phase.

10. A wireless charging system comprising:
a power receiving device; and
a charging device, wherein:
the power receiving device includes
a display configured to display a user interface (UI) that is configured to receive as input an application/non-application of an accessory cover;
an input interface configured to receive an input of the application/non-application of the accessory cover input via the UI;
a sensor configured to detect the application of the accessory cover, under a condition the input indicates the accessory cover is applied; and
circuitry configured to
adjust, under a condition the accessory cover is detected as being applied, a foreign object detection (FOD) parameter,
calculate reception power based on the FOD parameter, and
convey the reception power to the charging device; and
the charging device includes circuitry configured to
receive the reception power from the power receiving device,
determine whether a power intensity indicated by the reception power is equal to or less than a predetermined threshold, and
periodically increase or decrease an output power until the received reception power indicates the power intensity higher than the predetermined threshold.

11. The wireless charging system of claim 10, wherein the circuitry of the power receiving device is configured to adjust the FOD parameter so as not to erroneously detect a state where the accessory cover is applied but recognized as a foreign object.

12. The wireless charging system according to claim 10, wherein the reception power is conveyed in a signal strength packet (SSP).

13. The wireless charging system according to claim 10, wherein the circuitry of the charging device is configured to extract a signal strength value from the reception power.

14. The wireless charging system according to claim 10, wherein the circuitry of the power receiving device is configured to calculate the reception power by adding an offset value to a measured power value, the offset value being determined based on the FOD parameter.

15. The wireless charging system according to claim 10, wherein the sensor is a Hall effect sensor.

16. The wireless charging system according to claim 10, wherein the circuitry of the power receiving device is configured to convey the reception power to the charging device at a periodic interval during a power transfer phase.

* * * * *